United States Patent
Lewis

(10) Patent No.: US 9,083,195 B2
(45) Date of Patent: Jul. 14, 2015

(54) POWER HARVESTING SYSTEM FOR BATTERY OPERATED APPLIANCES

(71) Applicant: Raymond J. Lewis, Weaverville, NC (US)

(72) Inventor: Raymond J. Lewis, Weaverville, NC (US)

(*) Notice: Subject to any disclaimer, the term of this patent is extended or adjusted under 35 U.S.C. 154(b) by 143 days.

(21) Appl. No.: 14/054,809

(22) Filed: Oct. 15, 2013

(65) Prior Publication Data

US 2014/0196425 A1 Jul. 17, 2014

Related U.S. Application Data

(60) Provisional application No. 61/713,692, filed on Oct. 15, 2012, provisional application No. 61/789,677, filed on Mar. 15, 2013.

(51) Int. Cl.
| | |
|---|---|
| *A01D 43/00* | (2006.01) |
| *H02J 7/00* | (2006.01) |
| *A01D 34/78* | (2006.01) |
| *H02J 7/35* | (2006.01) |

(52) U.S. Cl.
CPC ............... *H02J 7/0068* (2013.01); *A01D 34/78* (2013.01); *H02J 7/0055* (2013.01); *H02J 7/35* (2013.01); *H02J 2007/0059* (2013.01)

(58) Field of Classification Search
CPC . A01D 34/78; A01D 34/6806; A01D 34/001; A01D 34/006; A01D 34/58; A01D 2101/00; A01D 69/025; A01D 69/02; H02P 4/00; H02J 7/0068; H02J 7/0055; H02J 7/35; H02J 2007/0059; B60L 3/00; B60L 2250/10; B60L 2200/40; B60L 2240/425; F02D 29/06; F02N 11/0862; F02N 11/14

USPC .................. 56/10.2 R, 10.6, 10.8, 11.9, 16.7; 290/1 A, 30 A, 34, 36 R; 320/104, 115, 320/137

See application file for complete search history.

(56) References Cited

U.S. PATENT DOCUMENTS

| | | | |
|---|---|---|---|
| 4,333,302 A | 6/1982 | Thomas et al. | |
| 4,870,811 A | 10/1989 | Steele | |
| 4,987,729 A | 1/1991 | Paytas | |
| 5,606,851 A | 3/1997 | Bruener et al. | |
| 5,619,845 A | 4/1997 | Bruener et al. | |
| 5,727,372 A | 3/1998 | Kanitz et al. | |
| 5,906,088 A | 5/1999 | Inui et al. | |
| 5,937,622 A | 8/1999 | Carrier et al. | |
| 6,392,370 B1 | 5/2002 | Bedini | |
| 6,591,593 B1* | 7/2003 | Brandon et al. | ............... 56/10.6 |
| 6,938,400 B2 | 9/2005 | Fillman et al. | |
| 7,007,446 B2* | 3/2006 | Dettmann | ....................... 56/11.9 |
| 7,741,793 B2 | 6/2010 | Lucas et al. | |
| 8,159,078 B2* | 4/2012 | Usselman et al. | ............ 290/1 A |
| 2004/0135373 A1 | 7/2004 | Osborne | |

* cited by examiner

*Primary Examiner* — Robert Pezzuto
(74) *Attorney, Agent, or Firm* — Dority & Manning, P.A.

(57) ABSTRACT

A system of harvesting electrical power for use within a battery operated device includes a battery and a motor driven by the battery to impart rotational energy to a first shaft. The first shaft drives a multi-phase generator and produces output voltage signals with respectively untimed phase responses. A rectification circuit combines the voltage signals into a combined DC voltage output, and an inverter connected to the rectification circuit converts the DC voltage output to an AC voltage output. A battery charger connected to the inverter receives the AC voltage output for charging the battery. The harvested power includes power from voltage sources with unregulated, or untimed, phase responses.

13 Claims, 10 Drawing Sheets

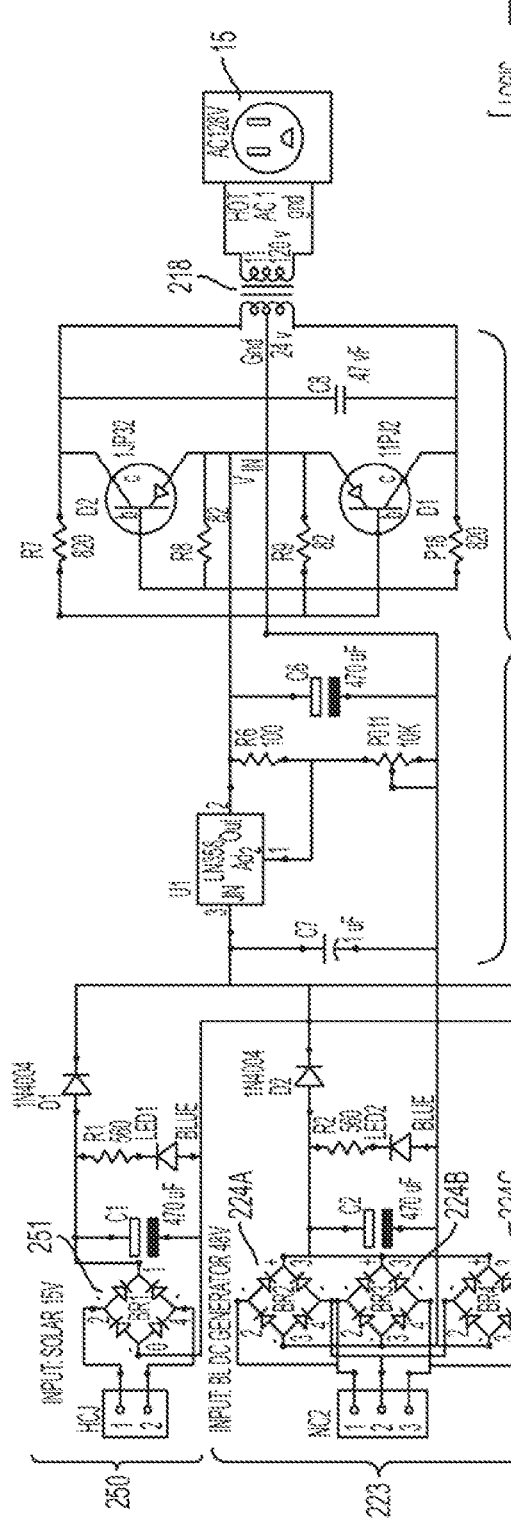
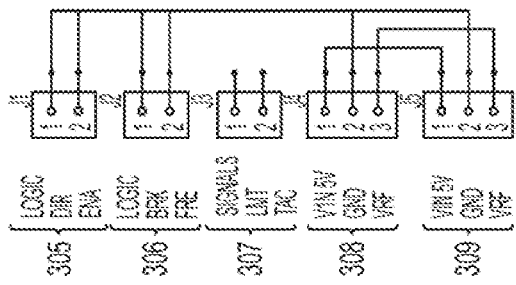
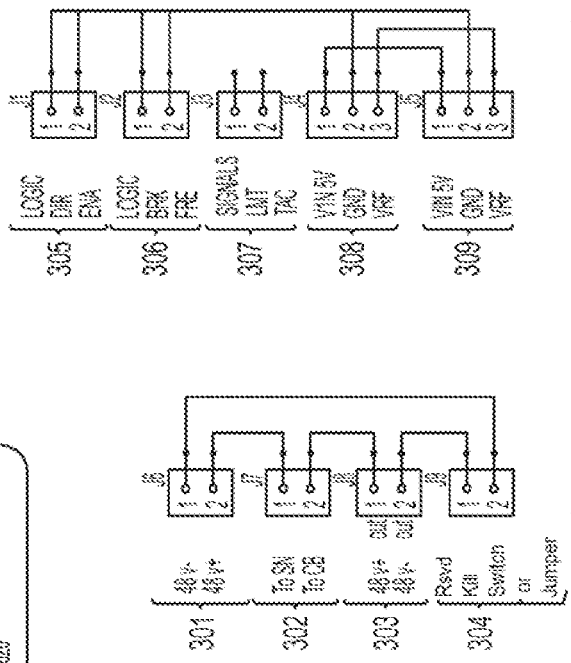
FIG. 10A
FIG. 10B
FIG. 10C

POWER HARVESTING SYSTEM FOR BATTERY OPERATED APPLIANCES

CROSS REFERENCE TO RELATED APPLICATIONS

This application claims the benefit of priority to two United States Provisional Patent Applications, including U.S. Ser. No. 61/713,692 entitled "Cordless Electric Lawnmower with Open System Energy Harvesting Engine" filed on Oct. 15, 2012, and U.S. Ser. No. 61/789,677, entitled "Cordless Electric Lawnmower with Open System Energy Harvesting Engine" filed on Mar. 15, 2013. Both of these provisional patent applications are incorporated by reference into this disclosure as if fully set forth herein.

FIELD OF THE INVENTION

This invention relates to an energy conserving electrical power system that includes a generator and that can be installed in battery-driven devices such as cordless electric lawn mowers.

BACKGROUND

Outdoor gasoline powered yard maintenance and recreational vehicles, lawn mowers in particular, consume a significant proportion of overall U.S. gasoline used during the summer months, thus increasing pollutants significantly, and adding to U.S. dependence on foreign oil. This has undesirable impacts on the U.S. ecology, economy, world perception of the U.S. and on national policy objectives. Attempts to sell battery-powered electric lawn mowers and other battery powered lawn care devices have had only limited success. Wider adoption of battery-powered electric appliances has been inhibited primarily by the inconvenience of short operating duration and long recharge times that result from the design dilemma of choosing the size or number of batteries possible without exceeding the weight and cost constraints inherent in current technology and designs.

There is a need in the art of battery powered outdoor mobile devices for a power solution that extends operating duration of cordless electric appliances such as lawn equipment, thereby reducing a deterrent to quicker and more widespread adoption of mobile electric lawn equipment to replace gasoline powered lawn equipment. Furthermore, there is a need in the art of battery powered appliances to reduce power requirements and acquire new energy at a rate somewhat less than the rate of energy consumption, thus extending the operating time until energy depletion occurs.

BRIEF SUMMARY OF THE INVENTION

In a first embodiment, a system of harvesting electrical power for use within a battery operated device includes a battery and a motor driven by the battery to impart rotational energy to a first shaft. The first shaft drives a multi-phase generator and produces output voltage signals with respectively untimed phase responses. A rectification circuit combines the voltage signals into a combined DC voltage output, and an inverter connected to the rectification circuit converts the DC voltage output to an AC voltage output. A battery charger connected to the inverter receives the AC voltage output for charging the battery.

In another embodiment, a system is used for powering a lawn mower with harvested energy sources and includes a bank of batteries, a motor driven by the bank of batteries and imparting rotational energy to a shaft, a multi-phase generator driven by the rotating shaft and producing generator voltage signals with respectively untimed phase responses. A generator rectification circuit combines the generator voltage signals into a combined DC voltage generator output. The system further incorporates a solar cell panel producing solar voltage signals, a solar rectification circuit creating a solar DC voltage signal, and an inverter receiving the generator voltage signals and the solar DC voltage signals to produce an AC voltage output from the two voltage signals. A battery charger is connected to the inverter and receives the AC voltage output for charging the battery.

In yet another embodiment, a lawn mower is disclosed and has reduced forces of friction therein. The lawn mower utilizes momentum in a rotating blade to cut grass with power from harvested sources within the lawn mower. The lawn mower includes a bank of batteries, a first brushless DC electric motor driven by the bank of batteries and imparting rotational energy to a first shaft. The first shaft drives a multi-phase generator to produce generator voltage signals. The winding leads from the generator terminate as multi-phase voltage sources. A generator rectification circuit connects directly to the winding leads, receiving untimed multi-phase voltage sources. The rectification circuit combines the generator voltage signals into a combined DC voltage generator output, and an inverter receives the generator voltage signals to produce an AC voltage output. A battery charger connected to the inverter and receives the AC voltage output for charging the battery. The lawn mower includes a blade with an interior portion connected to a second shaft driven by the motor and a gull wing portion connected to the interior portion, wherein the inner portion lies in a plane between the motor and the gull wing portion, and the gull wing portion engages grass for cutting.

BRIEF DESCRIPTION OF THE FIGURES

FIG. 10A is an electrical power circuit schematic of the power system of FIG. 9.

FIG. 10B is an electrical control system pin layout for a control circuit utilized according to the power system disclosed herein.

FIG. 10C is an electrical control system pin layout for a control circuit utilized according to the power system disclosed herein.

DETAILED DESCRIPTION

The power system disclosed herein utilizes a motor (21), such as a brushless direct current motor, to drive a generator (23) that provides power to recharge at least one battery and usually a bank of batteries (22). In this detailed description, the output of the generator is, of course, electrical current on standard windings, or coils, in the generator (23) that provide voltage signals for processing by the system and for an ultimate use to recharge the batteries (22). One of the features of the power conserving system disclosed herein is that the generator (23) can be used without phase regulation for the currents and voltages on the windings. In order to ensure that the current signals and voltage signals associated with a motor are in a particular phase relationship, many generators utilize controls, such as Hall sensors, to time the phases of each signal. In this disclosure, the generator (23) produces output current and voltage without any need for phase regulation. The system, therefore can be "untimed" in regard to phase response. Without limiting the invention to any one embodiment, the term "untimed" generally refers to the fact that the power system claimed and disclosed herein accepts all current and voltage responses from a generator (23) without the need for precise control of the phase.

Figure 3:
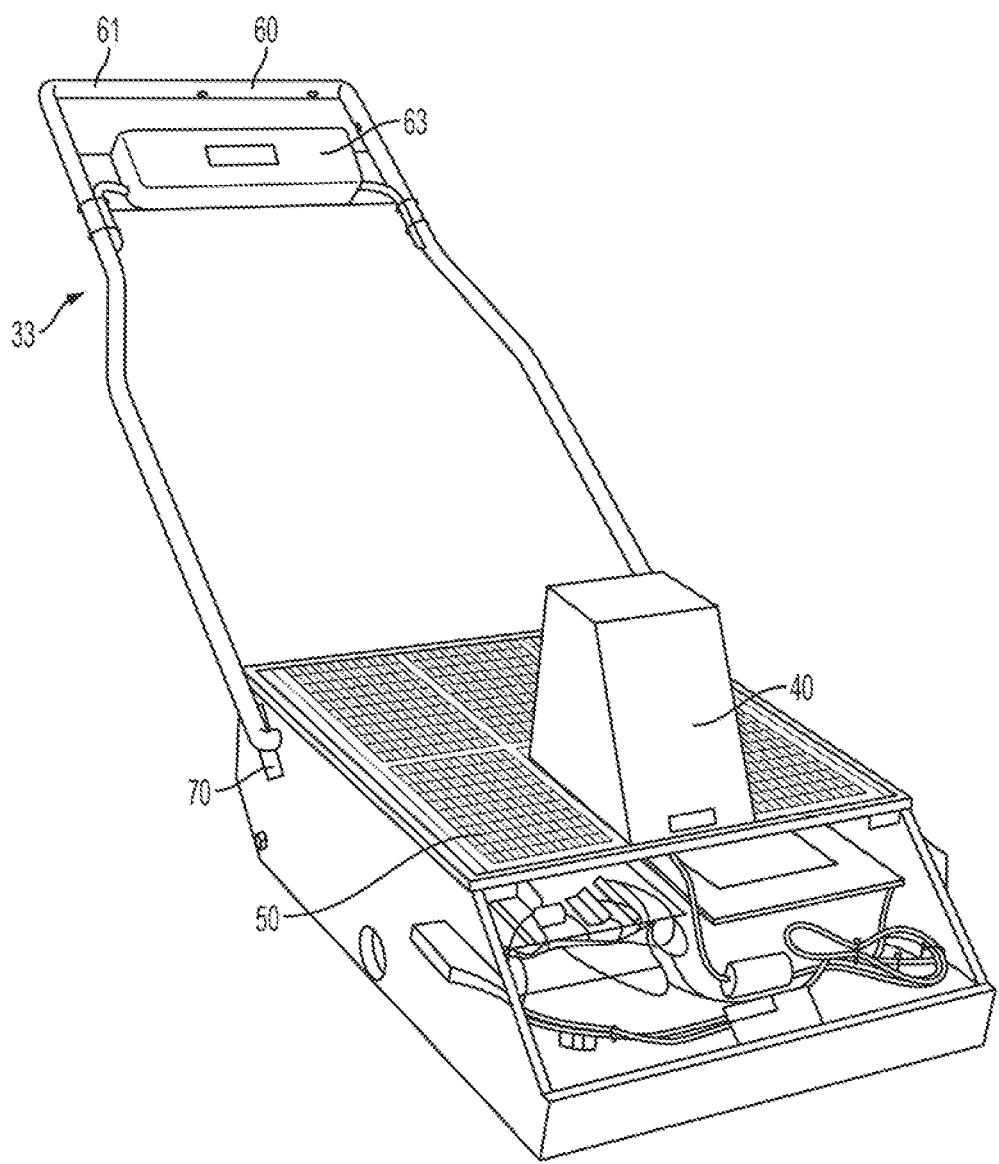
FIG. 3 is a perspective view of the entirety of the lawn more of FIG. 1 with a lawn mower handle attached to the lawn mower blade deck at a pivoting connection point as disclosed herein.
Figure 4:
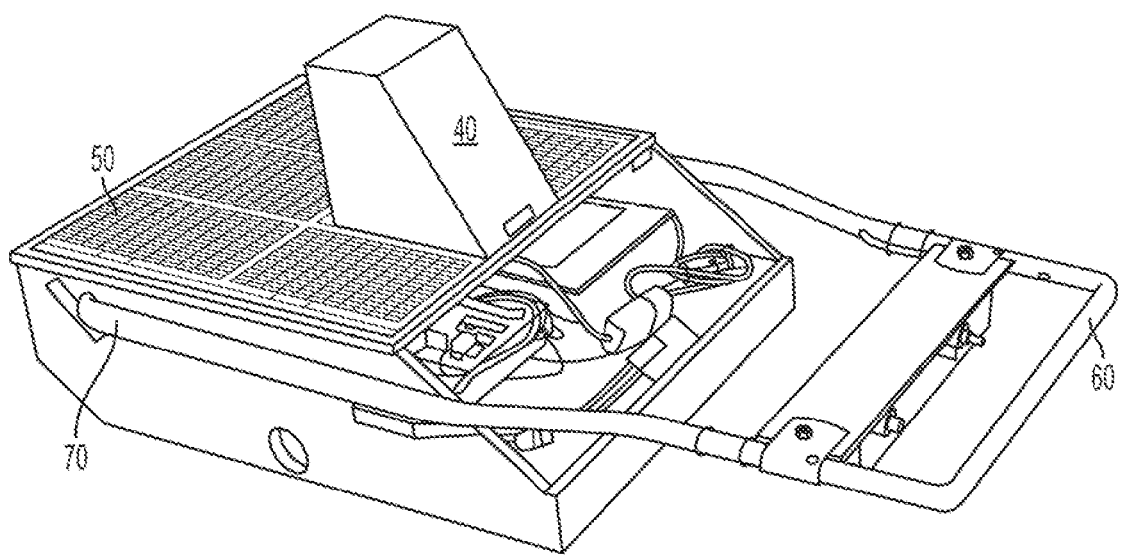
FIG. 4 is a top perspective view of the lawn mower and handle of FIG. 3 in a folded configuration with the handle turning about the pivoting connection shown in FIG. 2.
Figure 5:
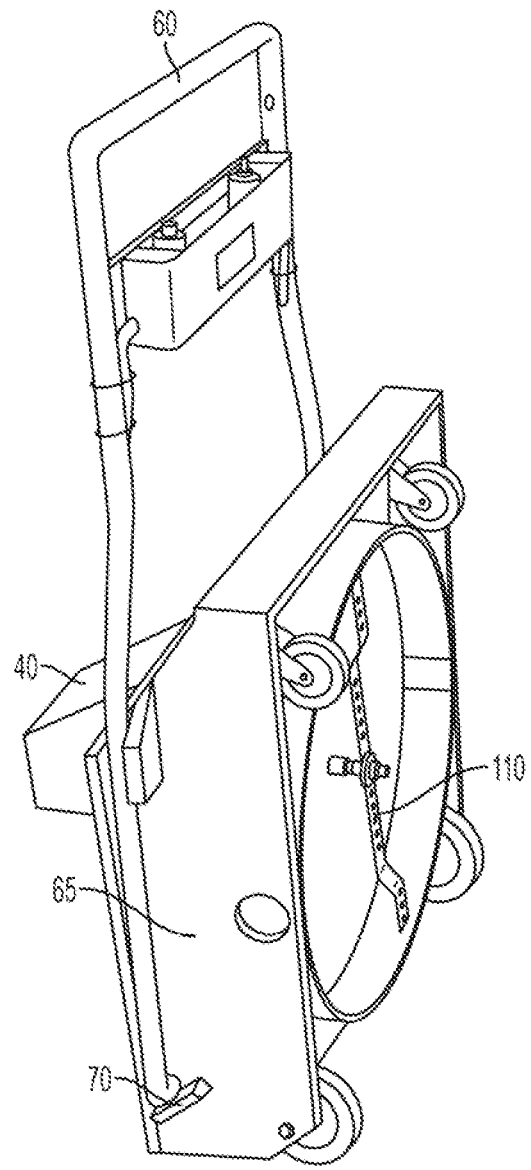
FIG. 5 is a bottom perspective view of the entirety of the lawn more of FIG. 1 with a lawn mower handle attached to the lawn mower blade deck at a pivoting connection point as disclosed herein.

Primarily because of the high voltages and amperages used and high speed of moving parts, a completely enclosed case (40) is required to incorporate the energy conserving power system disclosed herein into a battery operated device, such as a lawn mower (33). An enclosed case design also accommodates usability objectives for ease of cleaning and upright storage. Many case designs are possible. A correct case design must be large enough to accommodate all engine components inside the case with air space between all components in order to aid heat dissipation. A general specification for one embodiment of the case are provided in FIGS. 3, 4, and 5. In one non-limiting example, the case (40) design includes the power system disclosed herein and the blade deck (39), so the case is sized to accommodate a 20" inch rotary cutting blade (110). Without limiting the invention to any particular embodiment, the case (40) may be designed to be manufactured entirely of a glass fiber reinforced polypropylene plastic.

The case design incorporates a sturdy large flat rear surface (6), with specific Center-Of-Gravity (COG) alignment and specific rear wheel placement dimensions to allow easy tilting-up and stable rest in an upright vertical position that decreases the storage footprint of the device.

In one non-limiting embodiment, the case (40) requires a lid in two pieces. A lower lid may be a simple flat, rectangular cover positioned adjacent to the portion of the case it encloses. The lid features an outer-upper and inner-lower channel design. The arrangement creates a lip for mating the lid to case (40) and an inside frame lip for inset mounting a panel or panels across the top of the lid. In the preferred embodiment two panels of Lexan clear plastic cut to fit the opening, with thin film solar panels (50) held between the panels and facing upward, are placed within the inset and attached, and waterproof sealant applied. In one embodiment five solar panels rated at 15 volts at 300 milliamps and wired in parallel are used, although other solar panel values could be used. The solar cells are wired to a pair of sliding contacts on the underside of a lid on the case (40) that correspond to another mating pair of contacts mounted in the case (40). The final lid detail is the square protruding enclosure designed to cover and enclose a generator motor (23) projecting upward from the case below.

The power system disclosed herein requires a handle (60) of relatively conventional design except for the attachment method and wiring method. In the preferred embodiment the handle would be fabricated from 3000 or 5000 series aluminum hollow pipe to the specifications shown in the figures for example only. In one example, attachment hardware forms a right angle bend permitting the handle (60) to attach through the case (40) and be retained using a cotter pin hole. This also provides access to the hollow pipe directly from inside the case which allows all wiring to and from operator controls to be completely shielded from abrasion, kinks, or breakage. A cross brace (61) is also used as the mounting surface for the operator control pod (63).

The power system disclosed herein requires engine system controls to be accessible to the operator at all times. In the preferred embodiment the engine system controls are contained in a control pod housing (63) mounted on the handle cross brace (61). This arrangement and specifications for construction of a control pod may vary according to the market and regulatory issues. As a minimum, operator controls may include an on/off switch, plug-in recharge switch, speed control, and circuit interrupter in the form of either a fuse or a breaker. Indicator devices such as status lights are desirable and would be constructed in many different layouts constituting versions of the embodiment. In one exemplary embodiment, the on/off and plug-in switches are combined using a Dual-Pole Dual-Throw (DPDT) Amp rated switch because this arrangement makes possible only one mode of operation or the other at any time. The type of speed control is determined by the design of the drive motor controller electronics but the standard is normally a potentiometer operating either with passive resistance or with a 5VDC reference voltage. The control pod shown in the figures may be designed for a potentiometer with a rotary dial knob. The intended circuit interrupter is a 20 Amp Direct Current pushbutton circuit breaker. Four indicator lights may be used in the example of the figures. The first indicator is to show battery condition (usable or has reached maximum safe discharge), next an indicator of surplus or deficit flow of current, next an indicator to signal if any energy harvesting devices are generating electrical energy, and finally, an indicator that the engine system is either powered on or off. Mounted in a recess in the side of the control pod is a male receptacle for a standard household alternating current (AC) electrical socket. The receptacle is used to connect an extension cord between the control pod and AC source for recharging use when the system switch is set to the recharging position. The controls are intentionally similar in operation to conventional lawn mowers to aid transference of existing cognitive models about device behavior. This is done as a safety measure to minimize the potential for mistakes with a device that contains high voltages and, currents and sharp blades rotating at high speeds with minimal noise.

Figure 6:
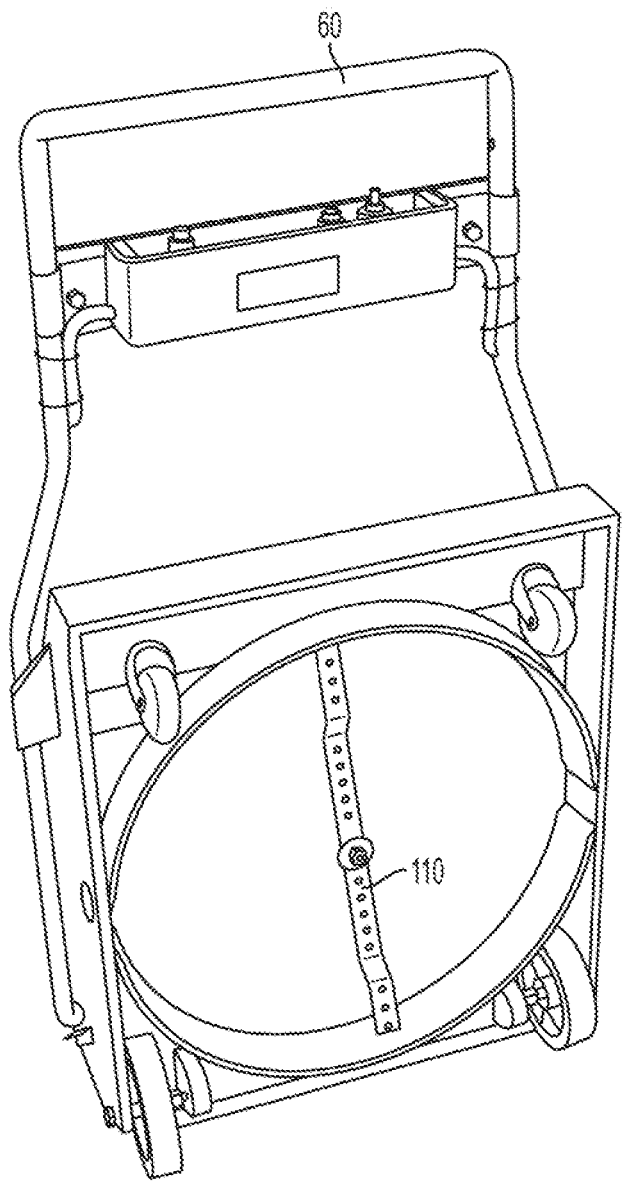
FIG. 6 is a bottom perspective view of the lawn mower of FIG. 1 with the blade exposed.
Figure 7A:
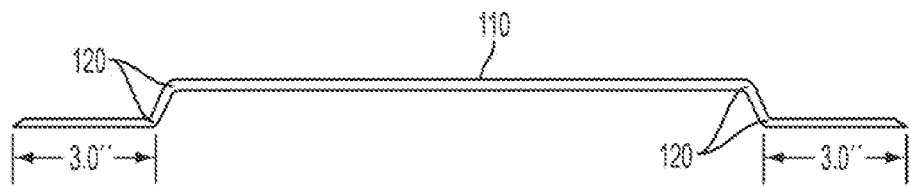
FIG. 7A is a cross section view of one embodiment of a lawn mower blade used with the lawn mower of FIG. 1.
Figure 7B:
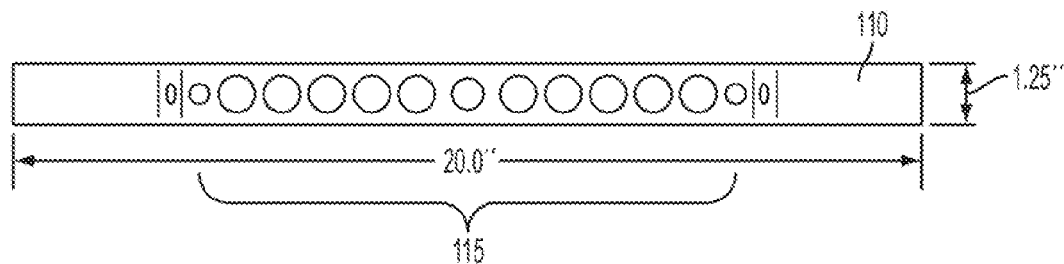
FIG. 7B is a top plan view of the lawn mower blade of FIG. 7A.
Figure 8:
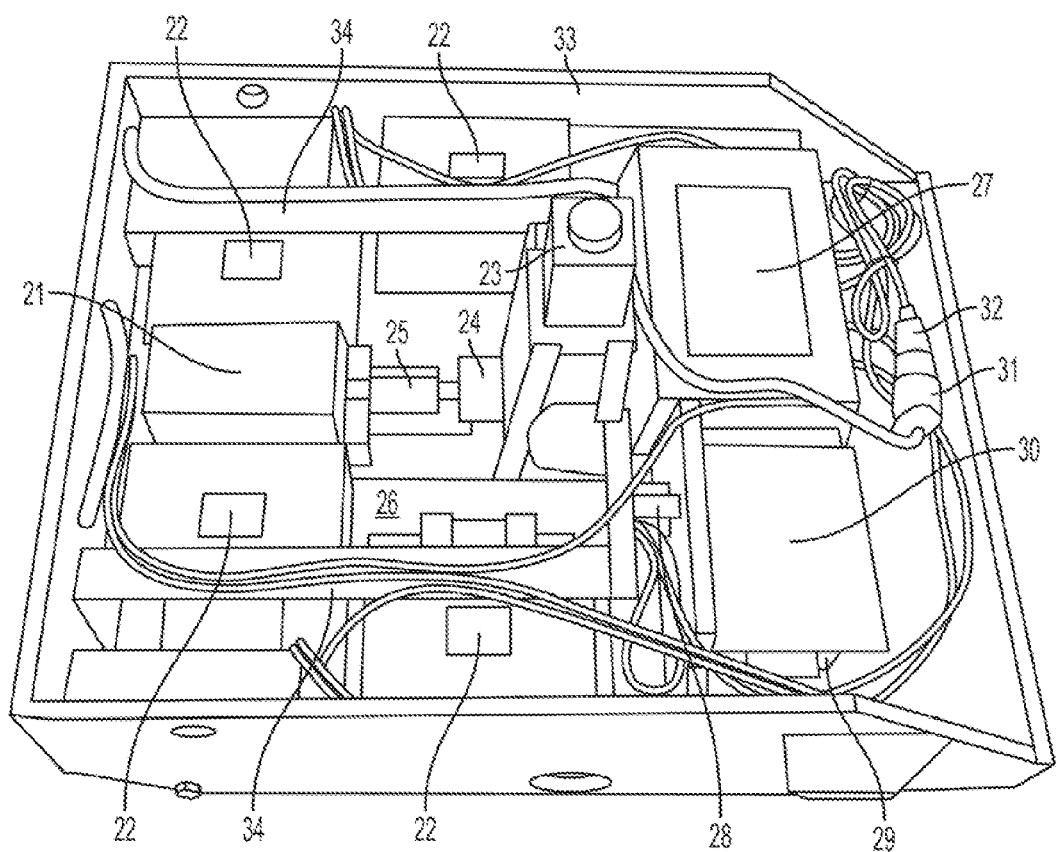
FIG. 8 is a perspective view of the components of the lawn mower illustrated schematically in FIG. 1

The blade (110) for the invention mounts in a conventional manner and location as shown in FIG. 6. However, in terms of form, material, weight, aerodynamic profile, and friction load, the embodiment blade is significant in comparison to those blades that are previously known. For example, a typical standard 20" inch blade will be made from hardened steel in a solid rectangular shape measuring 2.25" inches by 19.75" inches with a weight of 27 ounces. In contrast, the embodiment blade will be made of 5000 or 6000 series T6 grade hardened aluminum measuring 1.25" inches by 20.75" inches, with ten 0.625" inch and four 0.375" inch cutout holes in-line along the chord of the blade (110), and will have a weight of only 3.6 ounces, an 87% reduction in weight. A standard blade typically has an inverse airfoil pitch averaging 20 degrees which creates parasitic drag. The example embodiment blade (110) has 0 degrees of pitch and is sized and shaped to minimize parasitic drag. A standard blade typically has a flat profile which places 44 square inches of surface in friction contact with grass. In contrast, the example embodiment blade is shaped in an upside down "gull wing" profile that places only 3" inches at each blade tip, 7.5" square inches, in friction contact with grass, and this reduces friction contact with grass by 83%. These differences are critical to the overall design of the embodiment engine because reducing weight, drag, and friction decreases power requirements. Decreased power demand means the appliance can operate longer on a given amount of power. For the preferred implementation, testing data shows a 300% increase in useful operating time attributable to operation with the new blade. Because of blade differences the operating characteristics of the preferred embodiment also differ from current technology in other ways. Standard push mower blade speed is typically 2,700 RPM. In contrast the embodiment blade is engineered for blade speeds of up to 7,500 RPM (blade tip speed of 446 MPH which is 0.74 Mach), although, the motor and gearbox for the preferred embodiment limits blade speed to 5,250 RPM which requires less power.

The disclosed power system has a unique open systems engine design that allows the selection and use of several different motor, electrical bus, battery, energy harvesting device, and recharger combinations. In all cases the choice of components are intended to employ COTS technologies instead of custom engineered technologies. This method simplifies production supplier acquisition and long-term maintainability. It also reduces research and development (R&D) cycle time to adopt new or improved technologies.

The drive motor (21) is the motor used to turn the cutting blade (110). In order to minimize the frictional losses in the power system, one embodiment of the power system disclosed herein uses a Brushless Direct Current (BLDC) motor (21). One non-limiting example embodiment uses a 9.9 pound, 1,000 Watt or higher, 48 Volt BLDC motor, rated for 3,500 RPM or higher, and in a totally enclosed non-venting (TENV) case, with standard NEMA size mount. Use of BLOC motors in high RPM, high torque applications is a unique technology choice. BLDC motor efficiency can range from 85% to 95%. High motor efficiency is one of several interdependent design elements critical to this system's main advantage of longer operating duration. The motor (21) includes a first shaft (9) that is connected to the gear box (24) and the gear box drive shaft by a rigid coupler (25). During normal operation, the drive motor (21) is operated with an output that is between 25% to 50% of the rated capacity.

Standard "commercial off the shelf" (COTS) brushless direct current (BLDC) controller electronics devices are adequate and accommodate the control interfaces used in this disclosure. BLOC Controllers (29) are easily understood in the art and can be implemented without further specifications or directions herein.

Unlike most conventional designs, this invention requires a gearbox (24). In the example embodiment the gearbox will be a 1:1.5 ratio speed increaser with one input shaft (11) and two output shafts (16, 17). Example shafts may be 0.50 inches in diameter. At least one output shaft may be at a right angle to the input shaft (11). The gearbox (24) may have ratings of 85% or greater efficiency, 90 decibels or less, and suitable for motors up to 2000 Watts.

The drive motor (21), gearbox (24), and passive generator (23) may be held rigid and aligned with one another for the power system to operate within a device. Since this is an elementary task of fabrication of brackets or frames that could be done satisfactorily in numerous ways no exact specification need be detailed, it being sufficient to document the requirement.

Figure 1:
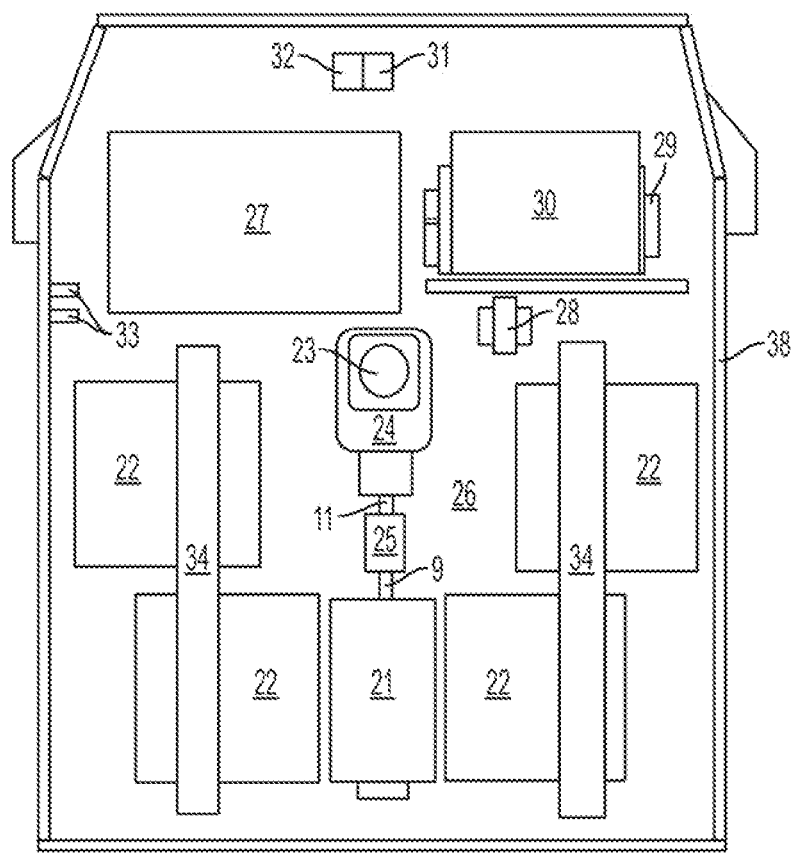
FIG. 1 is a schematic view of a lawn mower utilizing the energy conserving power system disclosed in this specification.
Figure 2:
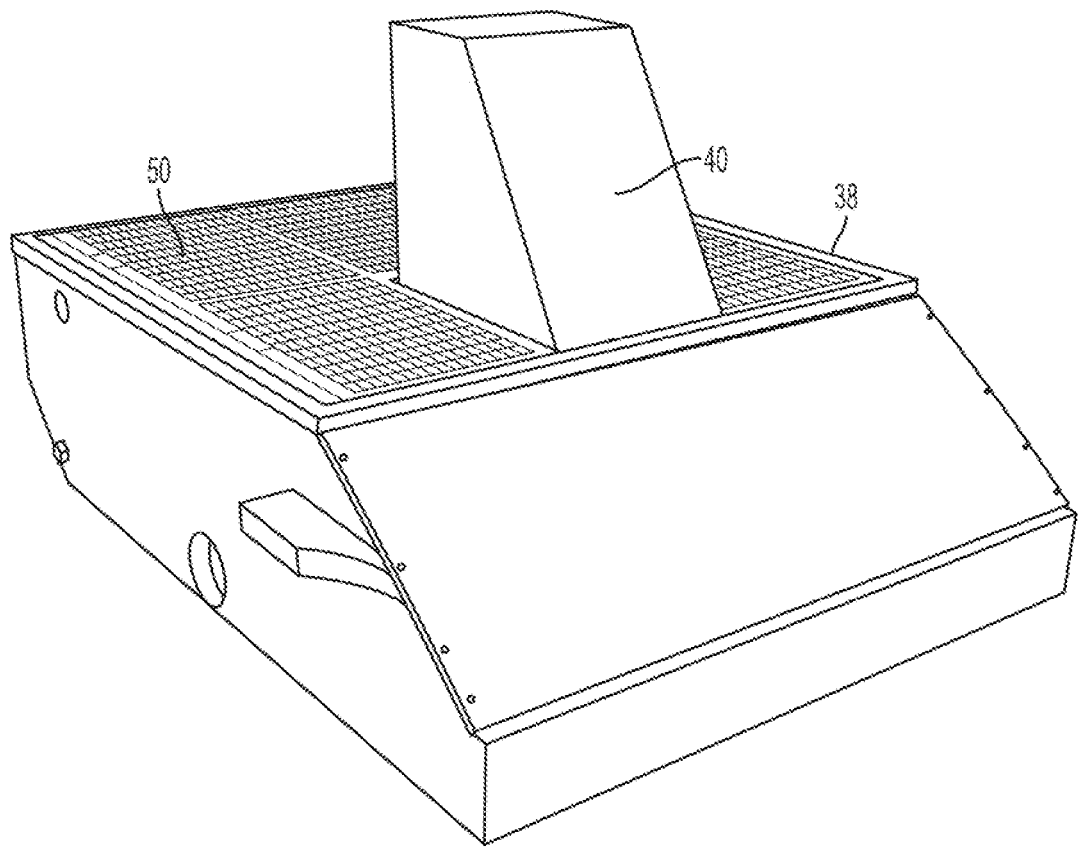
FIG. 2 is a perspective view of the outside of the blade deck encompassed within the lawn mower of FIG. 1.

In one embodiment, the disclosed power system includes at least one battery and usually a bank (22) of several batteries. In FIG. 1, an example system carries four or more installed 12V batteries. Sealed AGM lead batteries or NiCad batteries can be used. However, another example embodiment uses four Lithium-Iron-Phosphate (LiFePO4) batteries rated at 24 Amp-Hours each. This is because compared with equal battery case dimensions LiFePO4 batteries reduce weight by approximately 84%. Weight reduction is a necessary design element to ensure proper Center-of-Gravity (CG) for the upright storage feature, as well as for usability on non-level surfaces. LiFePO4 also possess other advantages over the lead or Nickel-Cadmium batteries used in current art. LiFePO4 batteries are thermally stable at higher temperatures (up to 150 degrees Fahrenheit), have higher energy density to mass (500% greater watt hours per kilogram), have a greater cycle life (1,000% greater as an average), and support high discharge and recharge rates. The only major disadvantage is high initial purchase cost This power system disclosed herein may use a 4-bank multibank battery charger (27). Incoming harvested power is inverted from DC current to 120VAC current and sent to the multibank charger (27) by a standard electric power cord and connectors. The use of this device is helpful to the engine system design because it enables harvested power to be reused while operating.

Figure 9:
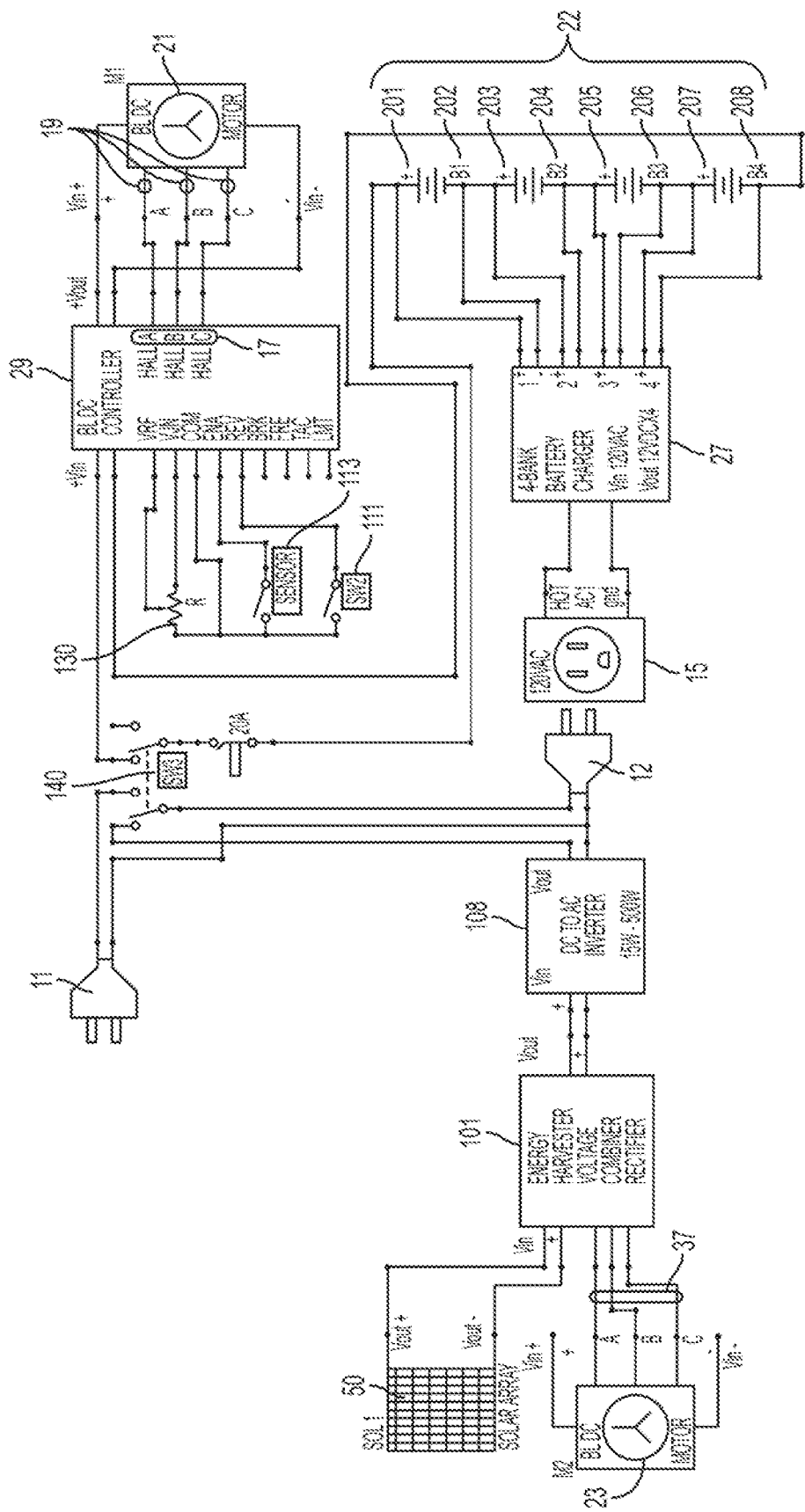
FIG. 9 is an electrical schematic of the energy harvesting and conserving power system disclosed herein.

This power system may typically include custom electronics on a master card (30) for two purposes: 1. to intake, rectify, and invert the power provided by each energy harvesting device used in an embodiment, and 2. to provide an interface for connecting component controls and indicator signals to operator controls and signals. There are a significant number of combinations possible. Therefore, to simplify and clarify, a proof-of-concept version shall be described as representative of the electronics design elements that will be found in any embodiment version. FIGS. 9 and 10 show the circuit specification. The design accepts multiple energy harvesting devices, typically including (but not limited to) a two-wire solar cell input (250), a three-wire multi-phase power input (223) from the generator (23) and three other two-wire inputs 260, 270, 280. Power is combined in parallel, rectified to 12 volts (required by the ratings of the transformer in use), converted to alternating current and input to the 12 volt secondary transformer windings and output as 120VAC from the primary windings and routed to the multibank charger (27). Throughout this process the power harvesting electronics are fully isolated from the engine systems circuitry.

This design allows multiple energy harvesting devices to be added to the system. In the preferred embodiment a minimum of two devices would be present: solar cell (50) and passive generator (23). This approach allows the embodiment to compensate for a fundamental design shortcoming found in all lawn mowers (and in all other powered mobile outdoor tools that rely on rotary motion as well). That shortcoming is that on average only 4% to 7% of the energy expended on rotation of the cutting blade is used for grass cutting per unit time. This is because a blade rotates much faster than the walking pace of the operator and this results in a cutting blade making additional rotations over already cut grass before movement occurs to the next uncut area. Current lawn mower technology does not provide the means to improve energy efficiency. In contrast, the embodiment engine is energy harvesting and recaptures between 15% to 35% of "waste" energy, depending on blade rotation speed. Additionally, the design harvests other available ambient energy from solar, thermoelectric, piezoelectric, and motion generators. The embodiment engine design collectively compensates for approximately 45% of the energy inefficiency of typical technology and in doing so extends the operating duration of the embodiment.

Five thin film solar panels are mounted in the case lid. Each panel is rated to produce 15 volts at 300 milliamps and is wired in parallel to produce a combined output of 15 volts at 1.5 Amps.

Excess expended drive motor power is partially recaptured by a motor used as a generator (23) attached to the second gearbox shaft as shown in FIG. 9. One example embodiment uses a fractional horsepower BLDC motor/generator (23) rated for a maximum 9,000 RPM, and terminal-to-terminal 48 volts at 16.5 amps. The winding leads (37) are terminated as voltage sources instead of feeds. The generator (23) produces voltage in an "untimed" manner in that the phase response is uncontrolled by any outside circuitry. In other words, regardless of whether certain voltage signals from the leads (37) cancel each other out, the system makes use of the voltage sources and the voltage signals thereon in the absence of phase regulation (i.e., in the absence of Hall sensors that the drive motor utilizes to guarantee a certain phase response). This arrangement takes advantage of the back Electromotive Force (EMF) effect to convert shaft mechanical energy into electrical energy.

Operation and maintenance of this power system and the example lawn mower differ from other lawn mowers. In operation, the lighter blade (110) design is suited to established lawns free from rocks and other debris. Clearing heavily overgrown lots, for example, is not feasible. To operate the device the operator turns on the system and sets the throttle speed dial at one-quarter to one-third power. Then, while mowing is underway, the operator should adjust the speed setting higher as conditions require and change the speed to the lowest possible usable level when conditions allow. This pattern of speed modulation by the operator further conserves energy and increases the operating duration of the invention. After each use of the invention the operator should ideally place the invention in the upright position and using a garden water hose, briefly wash grass and dirt off the outer surfaces. Then, upon storing the invention, plug-in the recharging cord. Altogether, maintenance time is estimated to be three to five minutes. Battery replacement is not planned to be an operator level task. Because of the high voltage and disposal requirements for lithium batteries, battery replacement would be done only by a qualified technician.

FIGS. 9 and 10 illustrate the power system described herein and used in the example lawn mower of FIGS. 1-8. In FIGS. 9 and 10, the respective untimed, or unregulated, phase responses of the currents and voltages produced by the power system disclosed herein do not hinder the windings in providing sufficient energy to power an associated battery pack (22), even in the absence of phase controllers such as Hall sensors (19) used in the drive motor (21). Beginning with FIG. 9, at the upper right corner, the drive motor (21) is driven by a battery in a battery pack (22) and imparts rotational energy to a first shaft (9). The motor (21) may be a brushless direct current motor that has an associated motor controller (29) that is well known in the industry, but not used in battery operated mobile devices for routine lawn maintenance or other household purposes. The motor (21) and its controller (29) operate with the control circuitry (111, 113, 140) for proper installation with the battery pack (22). The battery pack (22) is connected to a battery charger (27) to maintain its power charged state when the charger (27) receives power from a household outlet via a first plug (11) or when the generator (23) and other peripheral power sources provide power to the charger (27) via the second plug (12).

As illustrated in FIG. 10, for times when the generator circuitry (223) and other sources (e.g., solar cell circuit (250), motion generator circuit (260), piezoelectric generator circuit (270), and thermal generator circuit (280)) provide power to the battery charger (27), respective rectification stages (224, 251, 261, 271, 281) for the incoming voltage signals convert the harvested voltages to DC power. An inverter (108) and associated inverter circuitry staging (221) direct AC current to a transformer (218) that powers a 120 VAC outlet that allows the battery charger (27) to plug into a power source generated on board the appliance at hand and utilizing the power system described herein. As shown in FIG. 9, a switch (140) may allow the battery charger (27) to utilize a different plug (11) to plug into a standard house our building outlet instead of utilizing generator (23) power all the time.

FIG. 10A illustrates the different kinds of two wire and three wire power components that may be used for the overall system to harvest onboard power. In addition to the generator (23) and the solar cell (50), FIG. 10A includes references to circuitry (260) used with a motion induced power generator with a shaft that turns due to the user providing manual rotation force to motion generator shaft (e.g., a generator attached to the axle of a lawn mower wheel that turns when the user pushes the mower). Similarly, other kinds of power generators that can be installed on a household device include (i) generators that produce electrical power in response to thermal energy (e.g., a thermoelectric generator that converts heat generated by using a household device into electrical energy that helps power that device) and (ii) piezoelectric generators that generate power due to compression or vibration that occurs when a device such as a lawn mower is used.

FIGS. 10B and 10C illustrate examples of control circuitry used in the embodiment of FIG. 10A.

The above noted description depicts a power system that is particularly useful in, but not limited to, the context of mobile household appliances or small vehicles for many applications. The system harvests power from numerous sources onboard the appliance or vehicle at hand and combines the power harvesting with a carefully scaled arrangement of components that minimize drags on power, such as weight and frictional losses. For example, and without limiting the invention to any one embodiment, the use of a brushless DC drive motor and configuring a brushless DC drive motor as a generator minimize friction. The blade design of a lawn mower, for example, may be the above discussed inverted gull wing that also minimizes friction with grass contact as well as weight.

Additional features and components of the power system and its associated uses are set forth in the claims that follow.

The invention claimed is:
1. A system for powering a lawn mower with harvested energy sources, the system comprising:
   a bank of batteries;
   a motor driven by said bank of batteries and imparting rotational energy to a shaft;

a multi-phase generator driven by said rotating shaft and producing generator voltage signals with respectively untimed phase responses;

a generator rectification circuit combining said generator voltage signals into a combined DC voltage generator output;

a solar cell panel producing solar voltage signals;

a solar rectification circuit creating a solar DC voltage signal;

an inverter receiving said generator voltage signals and said solar DC voltage signal and producing an AC voltage output;

a battery charger connected to said inverter and receiving said AC voltage output for charging said battery.

2. A system according to claim 1, wherein said motor is a brushless DC motor.

3. A system according to claim 1, wherein said generator is a brushless generator.

4. A system according to claim 1, further comprising a thermoelectric generator providing additional power to said battery charger.

5. A system according to claim 1, further comprising a piezoelectric generate providing additional power to said battery charger.

6. A system according to claim 1, further comprising at least one additional multi-phase generator driven by rotational forces provided from outside the system by a user turning an additional shaft connected to the additional generator, said additional generator providing additional power to said battery charger.

7. A lawn mower having reduced forces of friction therein and zing momentum in a rotating blade to cut grass with power from harvested sources within the lawn mower, the lawn mower comprising:

a bank of batteries;

a first brushless DC electric motor driven by said bank of batteries and imparting rotational energy to a first shaft;

a multi-phase generator driven by said first shaft and producing generator voltage signals;

winding leads from said generator terminating as multi-phase voltage sources;

a generator rectification circuit connected directly to said winding leads, receiving untimed multi-phase voltage sources and combining said generator voltage signals into a combined DC voltage generator output;

an inverter receiving said generator voltage signals and producing an AC voltage output;

a battery charger connected to said inverter and receiving said AC voltage output for charging said battery; and a blade comprising an interior portion connected to a second shaft driven by said motor and a gull wing portion connected to said interior portion, wherein said inner portion lies in a plane between said motor and said gull wing portion, and said gull wing portion engages grass for cutting.

8. A lawn mower according to claim 7, wherein said blade comprises aluminum, and said blade has a weight that is less than 5 ounces.

9. A lawn mower according to claim 7, wherein said generator is a second brushless motor configured with coils generating said voltage signals.

10. A system according to claim 7, further comprising a solar cell providing additional power to said battery charger.

11. A system according to claim 7, further comprising a thermoelectric generator providing additional power to said battery charger.

12. A system according to claim 7, further comprising a piezoelectric generator providing additional power to said battery charger.

13. A system according to claim 7, further comprising at least one additional multi-phase generator driven by rotational forces provided from outside the system by a user turning an additional shaft connected to the additional generator, said additional generator providing additional power to said battery charger.

* * * * *